Nov. 5, 1963  C. O. KARL  3,109,576
BURST OPEN CONTAINERS
Original Filed Aug. 4, 1961

Inventor:
Clarence O. Karl
By his Attorney
Richard A Wise

United States Patent Office 3,109,576
Patented Nov. 5, 1963

3,109,576
BURST OPEN CONTAINERS
Clarence O. Karl, Hartford, Wis., assignor, by mesne assignments, to United Shoe Machinery Corporation, Boston, Mass., a corporation of New Jersey
Continuation of application Ser. No. 129,384, Aug. 4, 1961. This application Dec. 17, 1962, Ser. No. 245,261
16 Claims. (Cl. 229—51)

This invention relates to quick opening packages and more particularly to burst open containers for pressurized substances and is a continuation of my copending application for United States Letters Patent Serial No. 129,384, filed August 4, 1961. The invention has particular application to containers for leavened dough preformed into ready-to-bake biscuits, rolls or the like and is directed to containers which are inexpensive to manufacture, easily opened and which do not distort the contents in the process of being opened. The invention is also directed to the blanks from which such containers are made.

A substantial market has been found for premixed leavened dough for biscuits and the like which are preshaped and packed in tubular containers to be stored under refrigeration until ready for use. When desired, the containers are removed from refrigeration and allowed to stand at room temperature, opened, and the biscuits then placed in an oven for a short period of baking. The leavened dough, while in the container, is under pressure and it has been found that this pressure can be conveniently utilized as a bursting force for rapidly opening the container. However, certain requirements must be met in order to produce a successful container utilizing this principle. One requirement is that the container must not prematurely burst although it must be sufficiently weakened at a predetermined place or places so that it will burst open rapidly at the desired time. Another requirement is that the container must open rapidly over a large area in order successfully to remove the preshaped biscuits. Since the biscuits exert pressure on the interior surfaces of the container if only a small opening is made in the container or can, such as by cutting one end of the tubular body, the biscuits must be pushed or scooped out. This is obviously undesirable because the biscuits invariably lose their shape.

Numerous attempts have been made to produce tubular containers for leavened dough preshaped into biscuits, which containers are provided with burst-open seams located in their tubular or body portions. While some have been partially successful, none completely satisfy a very important requirement that in the process of opening the container, the shape of the preformed biscuits or rolls not be changed or distorted. Distortion often does, however, take place in opening bust-open containers, particularly those which require striking the container to initiate the rupture. Distortion has also been found to take place in the opening of burst-open containers which are provided with helically wound opening seams. This is because to remove all of the preshaped biscuits from the helically wound container it must be subsequently twisted to unwind the body material from the biscuits.

One of the objects of this invention is to provide an improved container for pressurized contents which is readily opened over a large area of its surface.

Another object of this invention is to provide an improved container for preshaped leavened dough which may be readily opened without cutting or striking the container.

Still another object of this invention is to provide a burst-open container for preshaped leavened dough which utilizes the pressure of the dough to rupture the container over a large area of its surface and, which when once opened, permits the dough to be removed without being squeezed, twisted or otherwise distorted.

Another object is to produce blanks from which the above-described containers may be made.

In accordance with these objects and as a feature of this invention there is provided a tubular container body or blank for the formation of a tubular body intended for pressurized contents, such as leavened, preshaped biscuits or the like. The blank or body is provided with a bursting line along which it is intended to rupture. The line includes a first portion having a bursting resistance or strength which is less than the bursting resistance of the unscored portion of the body but sufficient, without reinforcement, to withstand the static internal pressure of the container. The line also includes a second portion contiguous with the first portion which has a bursting resistance less than that of the first portion and which is insufficient, without reinforcement, to withstand the static internal pressure of the container and therefore constitutes the portion of the line initially intended to rupture. The bursting line may be prescored in the surface of the container body in various patterns or orientations but preferably extends lengthwise of the body substantially from end to end. Removable reinforcing means, one convenient form of which is in the form of adhesively applied tape, is secured to the body and overlies at least the second or weaker portion of the bursting line. When the reinforcing tape is removed, the internal pressure of the container causes the weaker or rupturable portion of the line to burst and the body then separates almost instantaneously along the remainder of the line to expose the contents. Thereafter, the edges of the burst seam may be gripped and the entire body separated from the contents of the container without squeezing, twisting, or otherwise distorting the contents.

As another feature of the invention transverse prescored tearing lines may be provided at the ends of the bursting line which facilitate the container body separating in generally circumferential directions.

The above and other features of the invention including various novel details of construction and combinations of parts will now be more particularly described with reference to the accompanying drawings and pointed out in the claims. It will be understood that the particular container embodying the invention is shown by way of illustration only and not as a limitation of the invention. The principles and features of this invention may be employed in numerous and varied embodiments without departing from the scope of the invention and need not be restricted to containers for biscuit dough.

Figure 1:
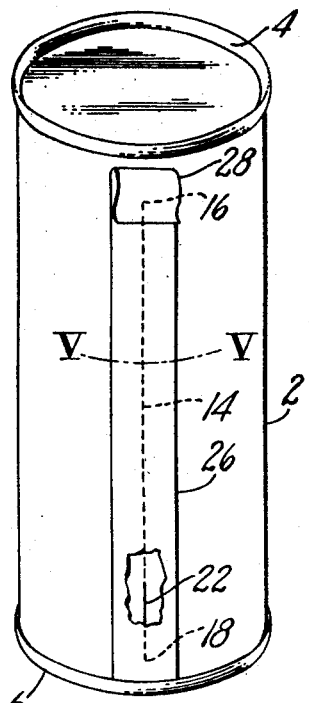
FIG. 1 is a perspective view with a portion broken away of a tubular container or can for leavened preshaped biscuits in upright position showing one form of bursting line inscribed in its surface and a reinforcing tape applied.

The invention is herein illustrated as embodied in a cylindrical container or can having a body portion 2 which may be formed from a flat blank. Ends 4 and 6 of metal or other suitable material close the top and bottom of the body portion 2, respectively, and may be secured in any conventional manner, such as double seaming. The body portion 2 has a conventional longitudinal side seam (not shown in the drawings) which extends from top to bottom. In the illustrative embodiment, the seam would be located on the side of the can which faces away from the viewer.

Figure 5:
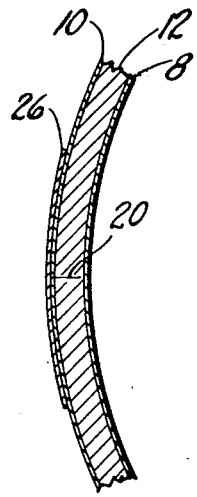
FIG. 5 is a sectional view taken on the line V—V of FIG. 1, on a larger scale, showing the construction of one form of container body and its bursting line.

As shown in FIG. 5, the illustrative body portion 2, is made of laminated material and includes a thin, inner, liquid impervious layer 8 of material, such as aluminum foil which may, if desired, be coated with plastic such as vinyl, on its inner surface to prevent contamination between the aluminum and the contents of the can. Another layer of aluminum foil 10, which may be appropriately printed and labeled, forms the outside of the can. Between the layers 8 and 10 is a layer 12 of fibrous material, such as chipboard or the like. Inscribed in the surface of the body 2 and extending lengthwise thereof substantially from end to end, is a bursting line 14 which begins at a point 16 near the top of the can and terminates at a point 18 near the bottom. While the line 14 is herein illustrated as extending parallel with the major axis of the body it need not be so oriented but may be inclined on a diagonal and furthermore may be a curved line.

Figure 2:
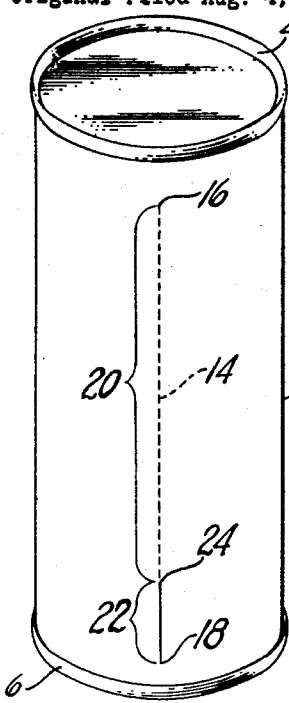
FIG. 2 is a view similar to FIG. 1 with the reinforcing tape omitted to expose the details of the bursting line.

The illustrative bursting line 14 comprises a first portion 20 of closely spaced incisions and a second portion 22 in the form of a continuous incision. The first and second portions of the line are contiguous and join at a point 24, see FIG. 2. Both portions of the line are incised in the body surface substantially as deep as the inner foil layer 8. While the bursting line 14 may be made in numerous ways, as for example, by a single line of varying depth, two contiguous lines of different depth or by a line of incisions having different spacing, the line must be formed so that the first portion has a bursting resistance which, without reinforcement, will withstand the static internal pressure of the container and with the second portion having a bursting resistance which, without reinforcement, will not withstand the internal pressure and therefore will rupture. The incisions do not cut through the inner layer 8. This is to preserve the impervious property of the inner layer. If liquid seepage into the fibrous layer 12 or "wicking," as it is sometimes called, is not a consideration, the incisions may cut all the way through the inner layer 8. If "wicking" is a problem and the incisions do cut through the inner layer, its interior surface may be covered with tape or coated with plastic, etc. It will also be appreciated that the line 14 need not be incised in the outer layer 10 but, if desired, may be formed in the interior fibrous layer 12 before the body stock is laminated.

Overlying at least the second or weaker portion 22 of the bursting line and herein shown as overlying the entire line 14, is a reinforcing tape 26 adhesively secured to the outer surface of the container body 2. The tape may be of any convenient metal, fiber or plastic material compatible with the other materials from which the can is made. The upper end of the tape 26 extends to the upper point 16 of the bursting line and there the tape is formed into a loop or tab 28 which may be conveniently gripped by the fingers. The tab 28, which can have any convenient shape or construction, may be secured by a spot of adhesive to the can body 2 or left free.

It will be appreciated that the line of incisions comprising the first portion 20 of the bursting line, even without the presence of the reinforcing tape 26, does not weaken the can body sufficiently for it to burst under the static pressure of the dough contained therein. However, the line or slit 22 comprising the second or weaker portion of the line is sufficiently weak so that, if not covered by the tape 26, it will rapidly burst open under the force of the static internal pressure.

Figure 3:
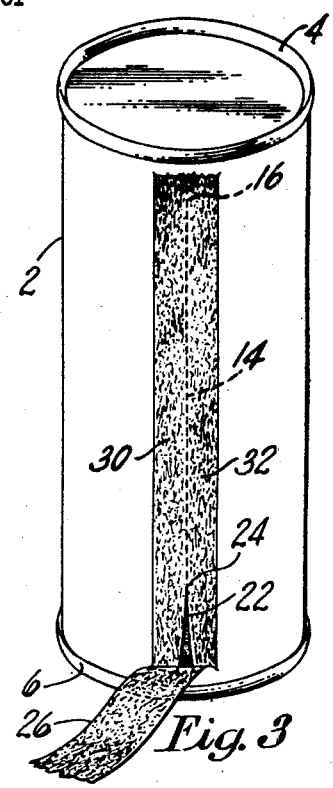
FIG. 3 is a view similar to FIG. 1 in which the reinforcing tape has been pulled from the top to the bottom of the continer at the instant the bursting line has begun to open.

The can is opened by pulling the tape 26 downwardly and away from the can body. As the tape is being pulled downwardly, the body remains intact until the tape has been removed beyond the point 24, thereupon the weaker portion 22 of the line 14 is exposed and immediately bursts open as shown in FIG. 3. This is followed, almost instantaneously in a continuous action, by the remaining portion 20 of the line rapidly separating in a direction opposite to that in which the tape has been removed, i.e. from the bottom toward the top of the can, the internal pressure applying itself not only radially, as in the static condition of the unopened can, but also circumferentially to tear the line lengthwise. It will be appreciated that if the tape 26 were removed first from the weaker portion 22, the can could not burst open virtually continuously along its entire length as it does when removed first from the stronger portion 20 of the line since the tape could not be pulled from the can quickly enough, i.e., the removal of the tape would impede the bursting. This would cause the biscuits, particularly at the lower end of the can, to extrude from the opening and lose their shape.

Figure 4:
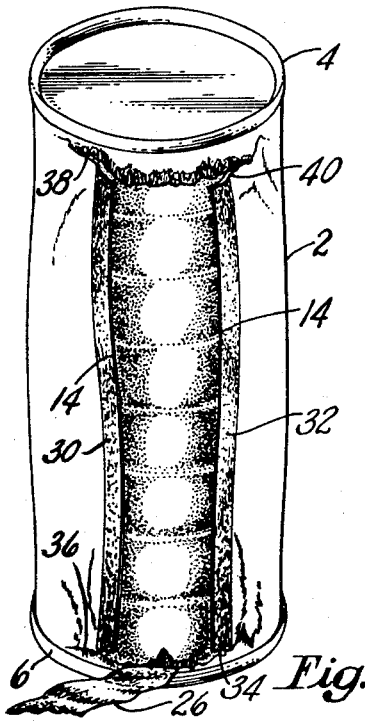
FIG. 4 is a view similar to FIG. 1 showing the container after the body has burst open along the line and prior to removal of the biscuits.

FIG. 4 shows the can after the tape has been removed and has burst open. It will be noted that part of the outer body layer 2 along the marginal areas 30 and 32 adjacent the bursting line 14, i.e., the area underlying the tape 26, has adhered to the tape and been stripped from the can, tearing with it a layer of the fibrous inner material 12. This will occur when the strength of the adhesive bonding the tape 26 to the can body is stronger than the internal tensile strength of the fibrous layer 12. This stripping or peeling is a valuable occurrence since it further weakens the line 14 and permits it to burst more rapidly.

Figure 6:
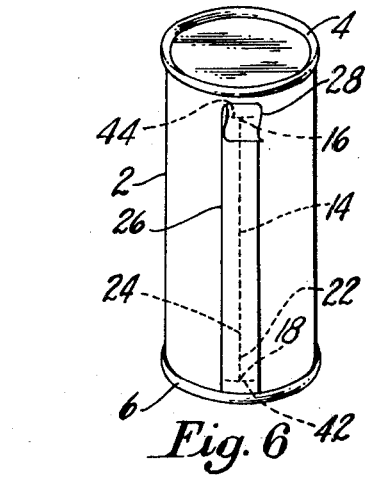
FIG. 6 is a view similar to FIG. 1 on a reduced scale showing the bursting line provided with transverse score lines to assist the container being opened in a circumferential direction.

It will be noted also that the body 2 tears a slight amount in a circumferential direction beginning at the points 16 and 18, the tearing occurring, as shown at 34, 36, 38 and 40. Because of this, the marginal areas 30, 32 may be more readily gripped to separate the body from the biscuits within the can. In order to aid the circumferential tearing of the can body at the points 16 and 18, the can may be prescored by lines 42, 44 (FIG. 6) which extend through the points 16 and 18 in a generally circumferential direction. The transverse lines 42, 44 need not be of greater length, and are preferably of lesser length than the width of the tape 26, as shown in FIG. 6. The lines 42, 44 may also diverge toward the end caps 4 and 6 as well as circumferentially as shown in FIG. 6 in order to expose fully the biscuits at the located ends of the cans.

The rapid bursting of the can substantially from end to end releases all of the internal pressure almost instantaneously without permitting the biscutis to extrude through an inadequate size opening as in prior burst-open cans. The circumferential tearing assures that the removal of the can body material from the biscuits may be accomplished easily without twisting or without otherwise distorting the biscuits.

Having thus described my invention, what I claim as new and desire to secure by Letters Patent of the United States is:

1. A blank of sheet material for forming a container for pressurized contents, said blank having prescored in one surface a line of cleavage weakened for bursting in response to a predetermined pressure applied to its opposite surface, a first portion along said line having a bursting resistance sufficient without reinforcement to withstand said pressure, a second portion of said line extending as a continuation of the first portion and having a bursting resistance insufficient without reinforcement to withstand said pressure, and a reinforcing tape removably secured to the prescored surface of the blank and overlying at least the second portion of the bursting line.

2. A blank of sheet material for forming a container for pressurized contents, said blank having prescored in one surface a line of cleavage weakened for bursting in response to a predetermined pressure applied to its opposite surface, a major portion along said line having a bursting resistance sufficient without reinforcement to withstand said pressure, a minor portion of said line extending as a continuation of the first portion and having a bursting resistance insufficient without reinforcement to withstand said pressure, and a reinforcing tape removably secured to the prescored surface of the blank and overlying at least the minor portion of the bursting line.

3. A blank of sheet material for forming a container for pressurized contents, said blank having prescored in one surface a line of cleavage weakened for bursting in response to a predetermined pressure applied to its opposite surface, a first portion along said line having a bursting resistance sufficient without reinforcement to withstand said pressure, a second portion of said line extending as a continuation of the first portion and having a bursting resistance insufficient without reinforcement to withstand said pressure, lines extending transversely of and intersecting said bursting line at its opposite ends, and a reinforcing tape removably secured to the prescored surface of the blank and overlying at least the second portion of the bursting line.

4. A blank of sheet material for forming a container for pressurized contents, said blank having prescored in one surface a line of cleavage weakened for bursting in response to a predetermined pressure applied to its opposite surface, a first portion along said line having a bursting resistance sufficient without reinforcement to withstand said pressure, a second portion of said line extending as a continuation of the first portion and having a bursting resistance insufficient without reinforcement to withstand said pressure, a reinforcing tape removably secured to the prescored surface of the body and overlying said bursting line, and means on the tape with which it may be pulled from the blank in a direction toward the second portion of the line first exposing said first portion of the line.

5. A blank of laminated sheet material for forming a container for pressurized contents, said blank having prescored in the exterior surface of one layer a line of cleavage weakened for bursting in response to a predetermined pressure applied to the exterior surface of a second layer, said second layer being impervious to liquid, a first portion along said line having a bursting resistance sufficient without reinforcement to withstand said pressure, a second portion of said line extending as a continuation of the first portion and having a bursting resistance insufficient without the reinforcement to withstand said pressure, and a reinforcing tape removably secured to the prescored surface of the blank and overlying at least the second portion of the bursting line.

6. A blank of laminated sheet material for forming a container for pressurized contents, said blank having prescored in the exterior surface of one layer a line of cleavage weakened for bursting in response to a predetermined pressure applied to the exterior surface of a second layer, said second layer being impervious to liquid, a first portion of said bursting line comprising a series of short closely spaced incisions inscribed in the surface of said first-mentioned layer and extending into the laminated material substantially to said liquid impervious layer and having a bursting resistance without reinforcement sufficient to withstand said pressure, a second portion of the bursting line extending as a continuation of the first portion and comprising an uninterrupted incision also extending into said laminated material substantially to said liquid impervious layer and having a bursting resistance without reinforcement insufficient to withstand said pressure, and a reinforcing tape removably secured to the prescored surface of said blank and overlying at least the second portion of the bursting line.

7. A container for pressurized preformed contents comprising a tubular body closed at its ends, a line of cleavage weakened for bursting extending substantially from end to end, a first portion of the line having a bursting strength sufficient without reinforcement to withstand the static internal pressure of the container, a second portion of the line extending as a continuation of the first portion and having a bursting strength insufficient without reinforcement to withstand the static internal pressure of the container, and a reinforcing tape removably secured to the surface of said body and overlying at least the second portion of the bursting line whereby when the tape is removed the body will rupture and separate rapidly along said bursting line.

8. A container for pressurized preformed contents comprising a tubular body closed at its ends, a line of cleavage weakened for bursting extending substantially from end to end, a major portion of the line having a bursting strength sufficient without reinforcement to withstand the static internal pressure of the container, a minor portion of said line extending as a continuation of the major portion and having a bursting strength insufficient without reinforcement to withstand the static internal pressure of the container, a reinforcing tape removably secured to the surface of the body and overlying at least the minor portion of the bursting line whereby when the tape is removed the container will rupture at said minor portion and separate rapidly along the bursting line substantially from one end of the body to the other.

9. A container for pressurized preformed contents comprising a tubular body closed at its ends, a line of cleavage weakened for bursting extending substantially from end to end, a first portion of the line having a bursting strength sufficient without reinforcement to withstand the static internal pressure of the container, a second portion of the line extending as a continuation of the first portion and having a bursting strength insufficient without reinforcement to withstand the static internal pressure of the container, lines extending transversely of and intersecting said bursting line at its opposite ends, and a reinforcing tape removably secured to the surface of said body and overlying at least the second portion of the bursting line whereby when the tape is removed the body will rupture and separate rapidly along said bursting line and said transverse lines.

10. A container for pressurized preformed contents comprising a tubular body closed at its ends, a line of cleavage weakened for bursting extending substantially from end to end, a major portion of the line having a bursting strength sufficient without reinforcement to withstand the static internal pressure of the container, a minor portion of said line extending as a continuation of the major portion and having a bursting strength insufficient without reinforcement to withstand the static internal pressure of the container, lines extending transversely of and intersecting said major and minor portions of the bursting line, and a reinforcing tape removably secured to the surface of the body overlying at least the minor portion of the bursting line whereby when the tape is removed the container will rupture at said minor portion and separate rapidly along the bursting line substantially from one end of the body to the other end along said transverse lines.

11. A container for pressurized preformed contents comprising a tubular body closed at its ends, a line of cleavage weakened for bursting extending substantially from end to end in a direction parallel with the axis of said tubular body, a major portion of said line having a bursting strength sufficient without reinforcement to withstand the static internal pressure of the container, a minor portion of said line extending as a continuation of the major portion and having a bursting strength insufficient without reinforcement to withstand the static internal pressure of the container, lines extending transversely of and intersecting said major and minor portions of the bursting line, a reinforcing tape removably secured to the surface of the body and overlying at least said minor portion of the bursting line, and means on the tape with which it may be pulled from the container in a direction to expose said minor portion whereby when the tape is removed the body will rupture at said minor portion and separate rapidly along the bursting line in an axial direction substantially from end to end and then along said transverse lines.

12. A container for pressurized preformed contents comprising a tubular body closed at its ends, said tubular body having a prescored line of cleavage weakened for bursting and extending substantially from end to end in a direction substantially parallel with the axis of the body, a first portion of said line having a bursting resistance sufficient without reinforcement to withstand the static internal pressure of the container, a second portion of said line extending as a continuation of said first portion of the line and having a bursting resistance insufficient without reinforcement to withstand the static internal pressure of the container, a reinforcing tape removably secured to the surface of the body and overlying said bursting line, and means on the tape with which it may be pulled from the container in a direction toward the second portion of the bursting line, first exposing said first portion of the line whereby when the tape is removed the body will rupture at the second portion of the line and separate rapidly along said line lengthwise of the container body in a direction opposite to that in which the tape was removed.

13. A container for pressurized preformed contents comprising a tubular body of laminated sheet material the inner layer of which is impervious to liquid, means closing the body at both ends, said tubular body having a prescored line of cleavage weakened for bursting extending substantially from end to end into the laminated material substantially to said inner layer, a first portion of said line having a bursting resistance sufficient without reinforcement to withstand the static internal pressure of the body and a second portion extending as a continuation of the first portion and having a bursting resistance insufficient without reinforcement to withstand the static internal pressure of the body, and a reinforcing tape removably secured to the surface of the body and overlying at least said second portion of the bursting line whereby when the tape is removed the body will rupture and separate rapidly along said bursting line.

14. A container for pressurized preformed contents comprising a tubular body of laminated material the inner layer of which is impervious to liquid, means closing the body at both ends, a line of cleavage weakened for bursting in the body of the container and extending substantially from end to end, a first portion of said bursting line comprising a series of short closely spaced incisions inscribed in the outer surface of the body and extending into the laminated material substantially to said inner layer and having a bursting resistance sufficient without reinforcement to withstand the static internal pressure of the container, a second portion of the bursting line extending as a continuation of the first portion and comprising an uninterrupted incision extending into said laminated material substantially to said inner layer and having a bursting resistance insufficient without reinforcement to withstand the static internal pressure of the contents, and a reinforcing tape removably secured to the surface of the body and overlying at least the second portion of the bursting line whereby when the tape is removed the body will rupture at said second portion and tear rapidly along said bursting line substantially from end to end.

15. A container for pressurized preformed biscuit dough comprising a tubular body of laminated material, the inner layer of which is impervious to liquid, means closing the body at both ends, a line of cleavage weakened for bursting in the body of the container extending substantially from end to end in a direction substantially parallel with the axis of the body, a major portion of said bursting line comprising a series of short closely spaced incisions inscribed in the outer surface of the body and extending into the laminated material substantially to said inner layer and having a bursting resistance without reinforcement sufficient to withstand the static internal pressure of the biscuit dough, a minor portion of the bursting line extending as a continuation of the major portion and comprising an uninterrupted incision extending into said laminated material substantially to said inner layer and having a bursting resistance without reinforcement insufficient to withstand the static internal pressure of the biscuit dough, a reinforcing tape removably secured to the surface of the body and overlying said bursting line, and means on the end of the tape covering said major portion of the line by which means the tape may be pulled from the container in a direction toward said minor portion of the bursting line whereby when the tape is removed the pressure of the biscuit dough will rupture the container when the minor portion of the line has been exposed and the container will separate rapidly along the bursting line in a direction opposite to that in which the tape was removed.

16. A container for pressurized preformed biscuit dough comprising a tubular body of laminated material, the inner layer of which is impervious to liquid, means closing the body at both ends, a line of cleavage weakened for bursting in the body of the container extending substantially from end to end in a direction parallel with the axis of the body, a major portion of said bursting line comprising a series of short closely spaced incisions inscribed in the outer surface of the body and extending into the laminated material substantially to said inner layer and having a bursting resistance without reinforcement sufficient to withstand the static internal pressure of the biscuit dough, a minor portion of the bursting line extending as a continuation of the major portion and comprising an uninterrupted incision extending into said laminated material substantially to said inner layer and having a bursting resistance without reinforcement insufficient to withstand the static internal pressure of the biscuit dough, prescored lines inscribed in the body surface substantially to the depth of said inner layer and located at the opposite ends of the bursting line and extending transversely thereof, a reinforcing tape removably secured to the surface of the body and overlying said bursting line and said transverse lines, and means on the tape on the end which covers said major portion of the bursting line by which the tape may be pulled from the container in a direction toward said minor portion of the line whereby when the tape is removed from the minor portion of the line the pressure of the biscuit dough will cause the container to rupture and separate rapidly along said bursting line in a direction opposite to that in which the tape was removed and in directions transversely of the bursting line at the ends thereof so that the dough may be removed from the container without distortion.

No references cited.